(12) United States Patent
Zhou et al.

(10) Patent No.: US 9,416,308 B2
(45) Date of Patent: Aug. 16, 2016

(54) CORE-SHELL STRUCTURED SILICATE LUMINESCENT MATERIAL AND PREPARATION METHOD THEREFOR

(75) Inventors: Mingjie Zhou, Guangdong (CN); Rong Wang, Guangdong (CN); Guitang Chen, Guangdong (CN)

(73) Assignees: Ocean's King Lighting Science & Technology Co., Ltd., Guangdong (CN); Shenzhen Ocean's King Lighting Engineering Co., Ltd, Guangdong (CN)

( * ) Notice: Subject to any disclaimer, the term of this patent is extended or adjusted under 35 U.S.C. 154(b) by 7 days.

(21) Appl. No.: 14/397,942

(22) PCT Filed: May 8, 2012

(86) PCT No.: PCT/CN2012/075209
§ 371 (c)(1),
(2), (4) Date: Oct. 30, 2014

(87) PCT Pub. No.: WO2013/166665
PCT Pub. Date: Nov. 14, 2013

(65) Prior Publication Data
US 2015/0083965 A1    Mar. 26, 2015

(51) Int. Cl.
C09K 11/77    (2006.01)
C09K 11/02    (2006.01)
B05D 3/04    (2006.01)

(52) U.S. Cl.
CPC ............ *C09K 11/025* (2013.01); *B05D 3/0413* (2013.01); *B05D 3/0453* (2013.01); *C09K 11/02* (2013.01); *C09K 11/7774* (2013.01); *C09K 11/7792* (2013.01)

(58) Field of Classification Search
CPC .. C09K 11/02; C09K 11/025; C09K 11/7774; C09K 11/7792; B05D 3/0413; B05D 3/0453
USPC ................. 252/301.4 F, 301.4 R; 427/213.31
See application file for complete search history.

(56) References Cited

U.S. PATENT DOCUMENTS

| | | |
|---|---|---|
| 3,855,143 A | 12/1974 | Schuil |
| 3,943,400 A | 3/1976 | Schuil |
| 8,895,143 B2 * | 11/2014 | Zhou .................... C09K 11/02 427/157 |
| 9,193,901 B2 * | 11/2015 | Zhou .................... C09K 11/02 |
| 2012/0093935 A1 | 4/2012 | Dembski et al. |

FOREIGN PATENT DOCUMENTS

| | | |
|---|---|---|
| CN | 1626615 A | 6/2005 |
| CN | 101033398 A | 9/2007 |
| CN | 102191033 A | 9/2011 |
| CN | 102191055 A | 9/2011 |
| JP | 51-002313 | 1/1976 |
| JP | 02-242880 A | 9/1990 |
| JP | 2001-181626 A | 7/2001 |
| JP | 2001-181627 A | 7/2001 |
| JP | 2005-344025 A | 12/2005 |
| JP | 2007-514631 A | 6/2007 |
| JP | 2010-155958 A | 7/2010 |
| JP | 2013-527274 A | 6/2013 |

OTHER PUBLICATIONS

Wen et al., "Intense Red-Emitting NaYSiO4:Eu3+,Mo6+ Phosphors for White Light-Emitting Diodes", Journal of the Electrochemical Society, vol. 158, No. 8, Jun. 15, 2011, pp. 1250-1254.*
International Search Report for corresponding International Application No. PCT/CN2012/075209 dated Feb. 21, 2013.
Japanese Office Action for corresponding Japanese Application No. 2015-510598 dated Nov. 4, 2015.
European Office Action for corresponding European Application No. 12876298.6 dated Oct. 30, 2015.

* cited by examiner

*Primary Examiner* — Matthew E Hoban
*Assistant Examiner* — Lynne Edmondson
(74) *Attorney, Agent, or Firm* — Renner, Otto, Boisselle & Sklar, LLP

(57) ABSTRACT

A core-shell structured silicate luminescent material and a preparation method thereof. The molecular formula of the luminescent material is: $MLn_{1-x}SiO_4:xRE@SiO_2$; where @ represents a coating, where M is one or two elements among Li, Na, and K, where Ln is one or two elements among Y, Sc, Lu and La, where the value of x is $0<x\leq0.6$; and where RE is one, two, or three elements among Tb, Gd, Sm, Eu, Dy, Ce and Tm. The compositions of the luminescent material are all chemicals of increased chemical stability, and, when subjected to electron beam bombardment for an extended period, provide a stable matrix and do not decompose easily.

10 Claims, 1 Drawing Sheet

CORE-SHELL STRUCTURED SILICATE LUMINESCENT MATERIAL AND PREPARATION METHOD THEREFOR

TECHNICAL FIELD

The present invention relates to the field of luminescent material, in particular to a core-shell structured silicate luminescent material and preparation method thereof.

BACKGROUND ART

In recent years, field emission devices due to their low operating voltage, low power consumption, while deflection coil, X-ray radiation, radiation and magnetic interference are not involved, are of great concern. Among them, the preparation of high-performance luminescent materials is one of the key factors in the manufacture of high-performance field emission devices.

Conventional sulfide-based phosphor powder includes: blue powder ZnS:Ag, Cl, $SrGa_2S_4$:Ce, green powder $SrGa_2S_4$:Eu and red powder $Y_2O_2S$:Eu.

For the sulfide-based phosphor powder, which the phosphor powder gets damp very readily, and that the matrix is generally unstable in a long-term electron beam bombardment, and thus got decomposed very readily to generate gases, such as $H_2S$, which the gases are not only poisonous to the cathode which results in the reduction of the ability of the cathode to emit electrons, but also results in the reduction of the luminous efficiency of the phosphor powder perse which shorten its life.

DISCLOSURE OF THE INVENTION

On this basis, for the unstable problem of matrix and the associated problem of ease to decompose caused by the long-term electron beam bombardment suffered by the conventional sulfide-based phosphor powder, it is necessary to provide a silicate luminescent material which the matrix is stable, and not decompose readily under long-term electron beam bombardment, and also a preparation method thereof.

A core-shell structured silicate luminescent material having the molecular formula of:

$$MLn_{1-x}SiO_4{:}xRE@SiO_2;$$

where, @ represents a coating;
M is one or two elements selected from Li, Na, and K;
Ln is one or two elements among Y, Sc, Lu and La, x is 0<x≤0.6; and
RE is one, two or three elements selected from Tb, Gd, Sm, Eu, Dy, Ce and Tm.

In one embodiment, x is 0.01≤x≤0.3.

A method of preparing a core-shell structured silicate luminescent material comprising the step of:

mixing 10 to 20 parts by volume of water, 15 to 50 parts by volume of anhydrous ethanol and 1 to 7 parts by volume of ammonia water, followed by dropwisely adding 0.5 to 3 parts by volume of tetraethylorthosilicate under stirring, stirring to react for 2 h to 6 h further, removing impurities after being separated by centrifugation, taking the precipitate and redispersing the same to 10 to 20 parts by volume of anhydrous ethanol to give a suspension of $SiO_2$ microsphere;

according to the stoichiometric ratio of the formula of $MLn_{1-x}SiO_4$:xRE, taking by measurement the nitrate solution of RE and nitrate solution of M, mixing the same homogenously, and subjecting the same to a water bath at 50° C. to 90° C., which the pH of the resulting mixture was adjusted to 1 to 6, followed by dropwisely adding tetraethylorthosilicate to give the resulting mixture, where M is one or two elements selected from Li, Na and K, Ln is one or more elements selected from Y, Sc, Lu and La, x ranges from 0<x≤0.6, RE is one, two or three elements selected from Tb, Gd, Sm, Eu, Dy, Ce and Tm;

according to the stoichiometric ratio of the formula of $MLn_{1-x}SiO_4{:}xRE@SiO_2$, adding said suspension of $SiO_2$ microsphere into said resulting mixture in a water bath at 50° C. to 90° C., stirring sufficiently to give a gel, drying the gel to give a precursor;

pre-baking said precursor, and subjecting the same to grinding, repeating the operation of grinding after pre-baking 1 to 4 times, followed by calcined in air or under a reducing atmosphere, to give the core-shell structured silicate luminescent material after cooling, having the molecular formula of: $Ln_{1-x}SiO_4{:}xRE@SiO_2$, where @ represents a coating.

In one embodiment, the step of removing impurities after separation by centrifugation comprises subjecting said suspension of $SiO_2$ microsphere containing impurities to centrifugal separation spinning at 12000 rpm, taking the precipitate, followed by washing the precipitate with deionized water three times.

In one embodiment, the concentration of said corresponding nitrate solution of RE and nitrate solution of M ranges from 0.1M to 5M.

In one embodiment, x ranges from 0.01≤x≤0.3.

In one embodiment, the step of drying the gel to give the precursor comprises completely drying the gel at 80° C. to 150° C. to give the precursor.

In one embodiment, the step of pre-baking said precursor and subjecting the same to grinding comprises pre-baking the precursor at 500° C. to 800° C. for 2 h to 7 h, followed by subjecting the same to grinding after cooling.

In one embodiment, the temperature of calcined in air or under a reducing atmosphere is 900° C. to 1600° C., and the time of calcined is 2 h to 10 h.

In one embodiment, said reducing atmosphere is a mixed atmosphere comprised of 95 vol % of $N_2$ and 5 vol % of $H_2$.

The core-shell structured silicate luminescent material thus prepared has the molecular formula of $MLn_{1-x}SiO_4$:$xRE@SiO_2$, of which the components are chemically stable, which the matrix is stable and not easily to decompose under long-term electron beam bombardment.

DETAILED DESCRIPTION OF THE EMBODIMENTS

To facilitate the understanding of the present invention, the present invention will be described in further details accompanying the drawings. The drawings give the preferable embodiment of the present invention. However, it should be understood that the detailed description of the embodiment is merely illustrative of the invention and is not to be construed a limiting the invention. The present invention can be achieved in many different ways.

The core-shell structured silicate luminescent material of one embodiment having the molecular formula of:

MLn$_{1-x}$SiO$_4$:xRE@SiO$_2$;

where, @ represents a coating;
M is one or two elements selected from Li, Na, and K;
Ln is one or two elements among Y, Sc, Lu and La, x is 0<x≤0.6; and
RE is one, two or three elements selected from Tb, Gd, Sm, Eu, Dy, Ce and Tm.

The core-shell structured silicate luminescent material according to the present invention is not easily decomposed due to the relatively high stability of the matrix under long-term electron beam bombardment. As compared with the non-core-shell structured luminescent material, the core-shell structured silicate luminescent material according to the present invention has a higher luminous efficiency and can be preferably used in the field emission light source device.

In a preferable embodiment, x is 0.01≤x≤0.3.

Figure 1:
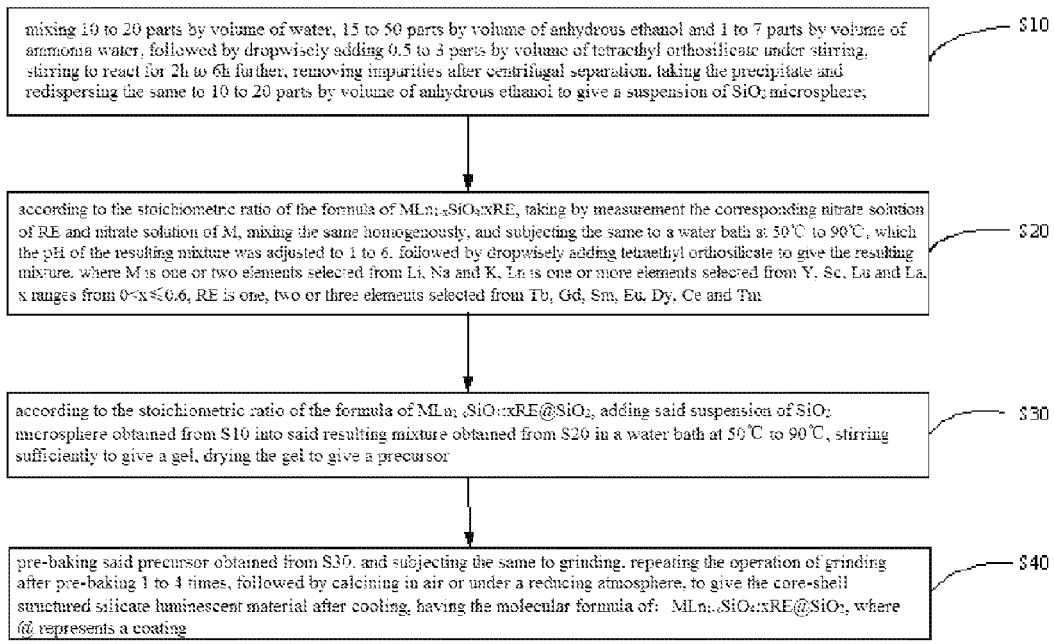
FIG. 1 shows a flowchart of the process of preparing the core-shell structured silicate luminescent material of one embodiment.

As depicted in FIG. 1, a method of preparing a core-shell structured silicate luminescent material comprises the step of:

S10: mixing 10 to 20 parts by volume of water, 15 to 50 parts by volume of anhydrous ethanol and 1 to 7 parts by volume of ammonia water, followed by dropwisely adding 0.5 to 3 parts by volume of tetraethylorthosilicate under stirring, stirring to react for 2 h to 6 h further, removing impurities after being separated by centrifugation, taking the precipitate and redispersing the same to 10 to 20 parts by volume of anhydrous ethanol to give a suspension of SiO$_2$ microsphere.

Said stirring may be conducted by magnetic stirring.

In the present embodiment, said suspension of SiO$_2$ microsphere containing impurities is subjected to centrifugal separation spinning at 12000 rpm, where the precipitate is taken out, and then washed with deionized water three times to remove the surplus ammonia water and residual TEOS to give the SiO$_2$ microsphere.

Said precipitation and redispersion may be conducted by ultrasonic dispersion.

S20: according to the stoichiometric ratio of the formula of MLn$_{1-x}$SiO$_4$:xRE, taking by measurement the corresponding nitrate solution of RE and nitrate solution of M, mixing the same homogenously, and subjecting the same to a water bath at 50° C. to 90° C., which the pH of the resulting mixture was adjusted to 1 to 6, followed by dropwisely adding tetraethylorthosilicate to give the resulting mixture, where M is one or two elements selected from Li, Na and K, Ln is one or more elements selected from Y, Sc, Lu and La, x ranges from 0<x≤0.6, RE is one, two or three elements selected from Tb, Gd, Sm, Eu, Dy, Ce and Tm.

The concentration of said corresponding nitrate solution of RE and nitrate solution of M ranges from 0.1M to 5M.

In one embodiment, x is 0.01≤x≤0.3.

In the present embodiment, the order of S10 and S20 can be interchanged with each other without affecting the method of preparing the core-shell structured silicate luminescent material.

S30: according to the stoichiometric ratio of the formula of MLn$_{1-x}$SiO$_4$:xRE@SiO$_2$, adding said suspension of SiO$_2$ microsphere into said resulting mixture in a water bath at 50° C. to 90° C., stirring sufficiently to give a gel, drying the gel to give a precursor.

MLn$_{1-x}$SiO$_4$:xRE and SiO$_2$ are mixed in a stoichiometric ratio of 1:1.

In the present embodiment, the gel is completely dried in an oven at 80° C. to 150° C. to give the precursor.

S40: the precursor thus prepared from S30 is pre-baked and then ground, the operation of grinding after pre-baking is repeated 1 to 4 times, followed by subjecting the same to calcined in air or under a reducing atmosphere, to give the core-shell structured silicate luminescent material after cooling, having the molecular formula of: MLn$_{1-x}$SiO$_4$:xRE@SiO$_2$, where @ is a coating.

The precursor is placed in a high temperature furnace and pre-baked at 500° C. to 800° C. for 2 h to 7 h, cooled to room temperature and then ground.

In order for increasing the coating thickness of MLn$_{1-x}$SiO$_4$:xRE, the process of grinding after pre-baking is repeated 1 to 4 times.

The ground precursor is placed in a box typed high temperature furnace or tube furnace, and then subjected to calcined at 900° C. to 1600° C. for 2 h to 10 h, to afford the desired core-shell structured silicate luminescent material.

In the present embodiment, the reducing atmosphere is a mixed atmosphere comprised of 95 vol % of N$_2$ and 5 vol % of H$_2$.

The method of preparing this core-shell structured silicate luminescent material produces the small sized core-shell structured powder having a uniform morphology by sol-gel method without milling. Traditional commercial luminescent material is mainly prepared by high-temperature solid-phase process, which the high temperature reaction is usually energy consuming, and that particles are unevenly distributed and presented in different morphologies, where milling is required to obtain the luminescent material having a particle size of 2 to 8 micron, by which the luminous intensity of the luminescent material will be reduced. In the present method of preparing the core-shell structured silicate luminescent material, the shell thickness of the luminescent material can be controlled by the process to prepare a core-shell luminescent material having a uniform and single morphology, and that the luminous intensity of the luminescent material thus prepared by the present method is stronger than that of the traditional commercially available luminescent material.

The specific embodiment of the present invention will now be given below.

Example 1

Preparation of NaY$_{0.99}$SiO$_4$:0.01Tb$^{3+}$@SiO$_2$ by Sol-Gel Method

1) Preparation of SiO$_2$ microsphere: 10 mL of water was placed in a beaker, followed by sequentially added therein 15 mL of anhydrous ethanol and 1 mL of ammonia water, and subjected to magnetic stirring to achieve homogenous, and dropwisely added therein 0.5 mL of tetraethylorthosilicate (TEOS) under magnetic stirring; after addition, reaction was stirred for 6 h to give a suspension of SiO$_2$ microsphere containing impurities. The suspension of SiO$_2$ microsphere containing impurities was then subjected to centrifugal separation spinning at 12000 rpm, rinsed with deionized water three times to remove surplus ammonia water and residual TEOS to give the SiO$_2$ microsphere as precipitate. The thus prepared SiO$_2$ microsphere was subjected to ultrasonic dispersion and redispersed in 10 mL of anhydrous ethanol to give a suspension of SiO$_2$ microsphere.

2) Preparation of NaY$_{0.99}$SiO$_4$:0.01Tb$^{3+}$@SiO$_2$ core-shell luminescent material: according to the chemical formula, 4.95 ml of 2 mol/L of Y(NO$_3$)$_3$ solution, 1 ml of 0.1 mol/L of Tb(NO$_3$)$_3$ solution and 5 ml of 2 mol/L of NaNO$_3$ solution were accurately weighed and placed in a beaker, heated with a water bath at 50° C., which the pH of the resulting mixture was adjusted to pH 1 using ammonia water and diluted nitrate solution. According to the required amount of a silicon source, 2.3 mL of tetraethylorthosilicate (TEOS) was measured and added dropwise to the above solution. Into the solution was added said suspension of $SiO_2$ microsphere under stirring in a water bath at 50° C., sufficient stirring was provided until a gel was obtained. The resulting gel was placed and completely dried in an oven at 80° C. to obtain a precursor. The precursor was placed in a high temperature furnace, and calcined at 500° C. for 7 h, cooled to room temperature and then ground; the ground precursor was then placed and calcined in a tube furnace at 900° C. in a reducing atmosphere comprised of 95% $N_2$+5% $H_2$ for 10 h, which was then allowed to cool, and taken out to give the desired core-shell luminescent material.

Example 2

Preparation of $LiLa_{0.7}SiO_4:0.3Ce^{3+}@SiO_2$ by Sol-Gel Method

1) Preparation of $SiO_2$ microsphere: 20 mL of water was placed in a beaker, followed by sequentially added therein 50 mL of anhydrous ethanol and 7 mL of ammonia water, and subjected to magnetic stirring to achieve homogenous, and dropwisely added therein 3 mL of tetraethylorthosilicate (TEOS) under magnetic stirring; after addition, reaction was stirred for 2 h to give a suspension of $SiO_2$ microsphere containing impurities. The suspension of $SiO_2$ microsphere containing impurities was then subjected to centrifugal separation spinning at 12000 rpm, rinsed with deionized water three times to remove surplus ammonia water and residual TEOS to give the $SiO_2$ microsphere as precipitate. The thus prepared $SiO_2$ microsphere was subjected to ultrasonic dispersion and redispersed in 20 mL of anhydrous ethanol to give a suspension of $SiO_2$ microsphere.

2) Preparation of $LiLa_{0.7}SiO_4:0.3Ce^{3+}@SiO_2$ core-shell luminescent material: according to the chemical formula, 3.5 ml of 2 mol/L of $La(NO_3)_3$ solution, 1.5 ml of 2 mol/L of $Ce(NO_3)_3$ solution and 5 ml of 2 mol/L of $LiNO_3$ solution were accurately weighed and placed in a beaker, heated with a water bath at 90° C., which the pH of the resulting mixture was adjusted to pH 6 using ammonia water and diluted nitrate solution. According to the required amount of a silicon source, 2.3 mL of tetraethylorthosilicate (TEOS) was measured and added dropwisely to the above solution. Into the solution was added said suspension of $SiO_2$ microsphere under stirring in a water bath at 90° C., sufficient stirring was provided until a gel was obtained. The resulting gel was placed and completely dried in an oven at 150° C. to obtain a precursor. The precursor was placed in a high temperature furnace, and calcined at 800° C. for 2 h, cooled to room temperature and then ground; the whole operation above may be repeated four times in order for increasing the coating thickness of $LiLa_{0.7}SiO_4:0.3Ce^{3+}@SiO_2$. The ground precursor was then placed and calcined in a tube furnace at 1600° C. in a reducing atmosphere comprised of 95% $N_2$+5% $H_2$ for 2 h, which was then allowed to cool, and taken out to give the desired core-shell luminescent material.

Example 3

Preparation of $KLu_{0.4}SiO_4:0.5Gd^{3+}$, $0.05Eu^{3+}$, $0.05Tm^{3+}@SiO_2$ by Sol-Gel Method 1) Preparation of $SiO_2$ microsphere: 15 mL of water was placed in a beaker, followed by sequentially added therein 20 mL of anhydrous ethanol and 3 mL of ammonia water, and subjected to magnetic stirring to achieve homogenous, and dropwisely added therein 1.5 mL of tetraethylorthosilicate (TEOS) under magnetic stirring; after addition, reaction was stirred for 3 h to give a suspension of $SiO_2$ microsphere containing impurities. The suspension of $SiO_2$ microsphere containing impurities was then subjected to centrifugal separation spinning at 12000 rpm, rinsed with deionized water three times to remove surplus ammonia water and residual TEOS to give the $SiO_2$ microsphere as precipitate. The thus prepared $SiO_2$ microsphere was subjected to ultrasonic dispersion and redispersed in 15 mL of anhydrous ethanol to give a suspension of $SiO_2$ microsphere.

2) Preparation of $KLu_{0.4}SiO_4:0.5Gd^{3+}$, $0.05Eu^{3+}$, $0.05Tm^{3+}@SiO_2$ core-shell luminescent material: according to the chemical formula, 2 ml of 2 mol/L of $Lu(NO_3)_3$ solution, 2.5 ml of 2 mol/L of $Gd(NO_3)_3$ solution and 1 ml of 0.5 mol/L of $Eu(NO_3)_3$ solution, 1 ml of 0.5 mol/L of $Tm(NO_3)_3$ solution and 5 ml of 2 mol/L of $KNO_3$ solution were accurately weighed and placed in a beaker, heated with a water bath at 70° C., which the pH of the resulting mixture was adjusted to pH 3 using ammonia water and diluted nitrate solution. According to the required amount of a silicon source, 2.3 mL of tetraethylorthosilicate (TEOS) was measured and added dropwisely to the above solution. Into the solution was added said suspension of $SiO_2$ microsphere under stirring in a water bath at 80° C., sufficient stirring was provided until a gel was obtained. The resulting gel was placed and completely dried in an oven at 100° C. to obtain a precursor. The precursor was placed in a high temperature furnace, and calcined at 600° C. for 4 h, cooled to room temperature and then ground; the whole operation above may be repeated twice in order for increasing the coating thickness of $KLu_{0.4}SiO_4:0.5Gd^{3+}$, $0.05Eu^{3+}$, $0.05Tm^{3+}@SiO_2$. The ground precursor was then placed and calcined in a box typed high temperature furnace or a tube furnace at 1200° C. in air for 3 h, which was then allowed to cool, and taken out to give the desired core-shell luminescent material.

Example 4

Preparation of $Na_{0.91}Li_{0.1}Y_{0.7}Sc_{0.1}SiO_4:0.15Gd^{3+}$, $0.05Sm^{3+}@SiO_2$ by Sol-Gel Method 1) Preparation of $SiO_2$ microsphere: 15 mL of water was placed in a beaker, followed by sequentially added therein 30 mL of anhydrous ethanol and 5 mL of ammonia water, and subjected to magnetic stirring to achieve homogenous, and dropwisely added therein 2 mL of tetraethylorthosilicate (TEOS) under magnetic stirring; after addition, reaction was stirred for 4 h to give a suspension of $SiO_2$ microsphere containing impurities. The suspension of $SiO_2$ microsphere containing impurities was then subjected to centrifugal separation spinning at 12000 rpm, rinsed with deionized water three times to remove surplus ammonia water and residual TEOS to give the $SiO_2$ microsphere as precipitate. The thus prepared $SiO_2$ microsphere was subjected to ultrasonic dispersion and redispersed in 20 mL of anhydrous ethanol to give a suspension of $SiO_2$ microsphere.

2) Preparation of $Na_{0.91}Li_{0.1}Y_{0.7}Sc_{0.1}SiO_4:0.15Gd^{3+}$, $0.05Sm^{3+}@SiO_2$ core-shell luminescent material: according to the chemical formula, 3.5 ml of 2 mol/L of $Y(NO_3)_3$ solution, 0.5 ml of 2 mol/L of $Sc(NO_3)_3$ solution and 3 ml of 0.5 mol/L of $Gd(NO_3)_3$ solution, 1 ml of 0.5 mol/L of $Sm(NO_3)_3$ solution, 4.5 ml of 2 mol/L of $NaNO_3$ solution and 0.5 ml of 2 mol/L of $LiNO_3$ solution were accurately weighed and placed in a beaker, heated with a water bath at 80° C., which the pH of the resulting mixture was adjusted to pH 2 using ammonia water and diluted nitrate solution. According to the required amount of a silicon source, 2.3 mL of tetraethylorthosilicate (TEOS) was measured and added dropwisely to the above solution. Into the solution was added said suspension of $SiO_2$ microsphere under stirring in a water bath at 80° C., sufficient stirring was provided until a gel was obtained. The resulting gel was placed and completely dried in an oven at 100° C. to obtain a precursor. The precursor was placed in a high temperature furnace, and calcined at 700° C. for 4 h, cooled to room temperature and then ground. The ground precursor was then placed and calcined in a box typed high temperature furnace or a tube furnace at 1100° C. in air for 4 h, which was then allowed to cool, and taken out to give the desired core-shell luminescent material.

Example 5

Preparation of $NaY_{0.8}SiO_4:0.18Gd^{3+}, 0.02Tb^{3+}$@$SiO_2$ by Sol-Gel Method 1) Preparation of $SiO_2$ microsphere: 15 mL of water was placed in a beaker, followed by sequentially added therein 30 mL of anhydrous ethanol and 5 mL of ammonia water, and subjected to magnetic stirring to achieve homogenous, and dropwisely added therein 1.5 mL of tetraethylorthosilicate (TEOS) under magnetic stirring; after addition, reaction was stirred for 4 h to give a suspension of $SiO_2$ microsphere containing impurities. The suspension of $SiO_2$ microsphere containing impurities was then subjected to centrifugal separation spinning at 12000 rpm, rinsed with deionized water three times to remove surplus ammonia water and residual TEOS to give the $SiO_2$ microsphere as precipitate. The thus prepared $SiO_2$ microsphere was subjected to ultrasonic dispersion and redispersed in 15 mL of anhydrous ethanol to give a suspension of $SiO_2$ microsphere.

2) Preparation of $NaY_{0.8}SiO_4:0.18Gd^{3+}, 0.02Tb^{3+}$@$SiO_2$ core-shell luminescent material: according to the chemical formula, 4 ml of 2 mol/L of $Y(NO_3)_3$ solution, 3.6 ml of 0.5 mol/L of $Gd(NO_3)_3$ solution, 0.4 ml of 0.5 mol/L of $Tb(NO_3)_3$ solution and 5 ml of 2 mol/L of $NaNO_3$ solution were accurately weighed and placed in a beaker, heated with a water bath at 80° C., which the pH of the resulting mixture was adjusted to pH 3 using ammonia water and diluted nitrate solution. According to the required amount of a silicon source, 2.3 mL of tetraethylorthosilicate (TEOS) was measured and added dropwisely to the above solution. Into the solution was added said suspension of $SiO_2$ microsphere under stirring in a water bath at 80° C., sufficient stirring was provided until a gel was obtained. The resulting gel was placed and completely dried in an oven at 120° C. to obtain a precursor. The precursor was placed in a high temperature furnace, and calcined at 600° C. for 5 h, cooled to room temperature and then ground. The ground precursor was then placed and calcined in a box typed high temperature furnace or a tube furnace at 1100° C. in a reducing atmosphere comprised of 95% $N_2$+5% $H_2$ for 4 h, which was then allowed to cool, and taken out to give the desired $NaY_{0.8}SiO_4:0.18Gd^{3+}, 0.02Tb^{3+}$@$SiO_2$ core-shell luminescent material.

$NaY_{0.8}SiO_4:0.18Gd^{3+}, 0.02Tb^{3+}$ luminescent material was prepared under the same condition except that a suspension of $SiO_2$ microsphere was not added.

Figure 2:
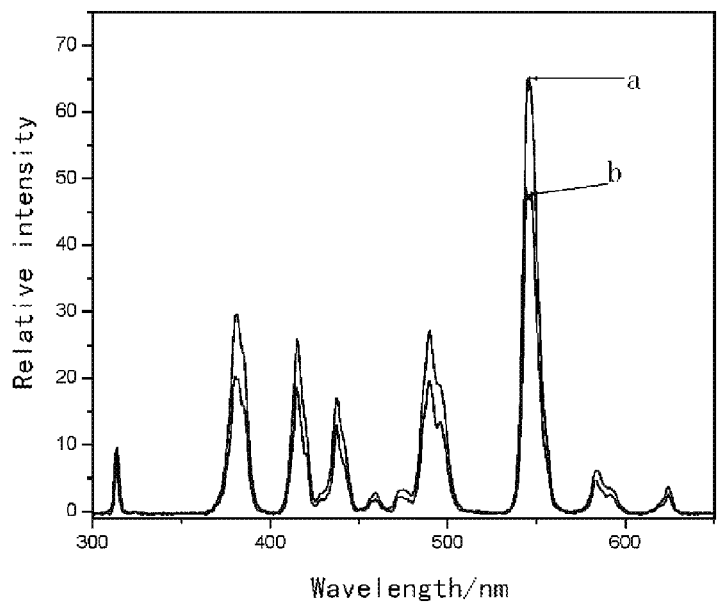
FIG. 2 shows a comparative plot of the luminescent spectrum of the core-shell structured silicate luminescent material prepared in Example 5 and that of the luminescent material having the formula of 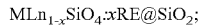$NaY_{0.8}SiO_4$:$0.18Gd^{3+}$, $0.02Tb^{3+}$ being excited with an electron beam at 5 kV.

In the comparative plot as shown in FIG. 2, curve a and b, represents, respectively, the luminescent spectrum of the $NaY_{0.8}SiO_4:0.18Gd^{3+}, 0.02Tb^{3+}$@$SiO_2$ core-shell luminescent material of the present example and that of $NaY_{0.8}SiO_4:0.18Gd^{3+}, 0.02Tb^{3+}$ luminescent material being excited with an electron beam at 5 kV.

From the figure, it can be seen that as comparing with the $NaY_{0.8}SiO_4:0.18Gd^{3+}, 0.02Tb^{3+}$ luminescent material, $NaY_{0.8}SiO_4:0.18Gd^{3+}, 0.02Tb^{3+}$@$SiO_2$ core-shell luminescent material has a stronger luminous intensity, which shows an increasement of 33%.

Example 6

Preparation of $NaLa_{0.95}SiO_4:0.05Dy^{3+}$@$SiO_2$ by Sol-Gel Method

1) Preparation of $SiO_2$ microsphere: 15 mL of water was placed in a beaker, followed by sequentially added therein 30 mL of anhydrous ethanol and 5 mL of ammonia water, and subjected to magnetic stirring to achieve homogenous, and dropwisely added therein 2 mL of tetraethylorthosilicate (TEOS) under magnetic stirring; after addition, reaction was stirred for 4 h to give a suspension of $SiO_2$ microsphere containing impurities. The suspension of $SiO_2$ microsphere containing impurities was then subjected to centrifugal separation spinning at 12000 rpm, rinsed with deionized water three times to remove surplus ammonia water and residual TEOS to give the $SiO_2$ microsphere as precipitate. The thus prepared $SiO_2$ microsphere was subjected to ultrasonic dispersion and redispersed in 20 mL of anhydrous ethanol to give a suspension of $SiO_2$ microsphere.

2) Preparation of $NaLa_{0.95}SiO_4:0.05Dy^{3+}$@$SiO_2$ core-shell luminescent material: according to the chemical formula, 4.75 ml of 2 mol/L of $La(NO_3)_3$ solution, 1 ml of 0.5 mol/L of $Dy(NO_3)_3$ solution and 5.0 ml of 2 mol/L of $NaNO_3$ solution were accurately weighed and placed in a beaker, heated with a water bath at 80° C., which the pH of the resulting mixture was adjusted to pH 5 using ammonia water and diluted nitrate solution. According to the required amount of a silicon source, 2.3 mL of tetraethylorthosilicate (TEOS) was measured and added dropwisely to the above solution. Into the solution was added said suspension of $SiO_2$ microsphere under stirring in a water bath at 80° C., sufficient stirring was provided until a gel was obtained. The resulting gel was placed and completely dried in an oven at 100° C. to obtain a precursor. The precursor was placed in a high temperature furnace, and calcined at 650° C. for 5 h, cooled to room temperature and then ground. The ground precursor was then placed and calcined in a box typed high temperature furnace or a tube furnace at 950° C. in air for 5 h, which was then allowed to cool, and taken out to give the desired core-shell luminescent material.

Although the preferable embodiments of the present invention has been described and illustrated in detail, it is clearly understood that the same is not to be taken by way of limitation, it should be understood that various changes, substitutions, and alterations could be made hereto by an ordinary skilled person in the art without departing from the spirit and scope of the invention as defined by the appended claims.

What is claimed is:
1. A core-shell structured silicate luminescent material, having the molecular formula of: $MLn_{1-x}SiO_4:xRE$@$SiO_2$;
   where, @ represents a coating, $SiO_2$ is a core;
   M is one or two elements selected from Li, Na, and K;
   Ln is one or two elements selected from Y, Sc, Lu and La,
      x is $0<x\leq0.6$; and;
   RE is one, two or three elements selected from Tb, Gd, Sm, Eu, Dy, Ce and Tm.

2. A core-shell structured silicate luminescent material according to claim 1, wherein x is 0.01≤x≤0.3.

3. A method of preparing a core-shell structured silicate luminescent material comprising the steps of:
mixing 10 to 20 parts by volume of water, 15 to 50 parts by volume of anhydrous ethanol and 1 to 7 parts by volume of ammonia water, followed by adding dropwise 0.5 to 3 parts by volume of tetraethylorthosilicate under stirring, stirring further to react for 2 h to 6 h to give a crude suspension of $SiO_2$ microsphere,
subjecting said crude suspension of $SiO_2$ microsphere to centrifugal separation, taking precipitate from the system, followed by washing the precipitate with deionized water to remove impurities, and then redispersing the precipitate in 10 to 20 parts by volume of anhydrous ethanol to give a suspension of $SiO_2$ microsphere;
according to the stoichiometric ratio of the formula of $MLn_{1-x}SiO_4$:xRE, taking by measurement the corresponding weighing a nitrate solution of RE and a nitrate solution of M, respectively, homogeneously mixing the nitrate solution of RE and the nitrate solution of M to form a mixture, and subjecting the mixture to a water bath at 50° C. to 90° C., adjusting the pH of the mixture to 1 to 6, followed by adding dropwise thereto a solution of tetraethylorthosilicate to give a mixed solution, where M is one or two elements selected from Li, Na and K, Ln is one or more elements selected from Y, Sc, Lu and La, x ranges from 0<x≤0.6, RE is one, two or three elements selected from Tb, Gd, Sm, Eu, Dy, Ce and Tm;
according to the stoichiometric ratio of the formula of $MLn_{1-x}SiO_4$:xRE@$SiO_2$, adding said suspension of $SiO_2$ microsphere into said mixed solution in a water bath at 50° C. to 90° C., stirring sufficiently to give a gel, drying the gel to give a precursor;
pre-baking said precursor, and subjecting the same to grinding, repeating the operation of grinding after pre-baking 1 to 4 times, followed by calcining in air or under a reducing atmosphere, to give the core-shell structured silicate luminescent material after cooling, having the molecular formula of: $MLn_{1-x}SiO_4$:xRE@$SiO_2$, where @ represents a coating, $SiO_2$ is a core.

4. A method of preparing the core-shell structured silicate luminescent material according to claim 3, wherein said centrifugal separation is conducted at 12000 rpm, and said precipitate is washed with deionized water three times.

5. A method of preparing the core-shell structured silicate luminescent material according to claim 3, wherein the concentration of said corresponding nitrate solution of RE and nitrate solution of M ranges from 0.1M to 5M.

6. A method of preparing the core-shell structured silicate luminescent material according to claim 3, wherein x ranges from 0.01≤x≤0.3.

7. A method of preparing the core-shell structured silicate luminescent material according to claim 3, wherein the step of drying the gel to give the precursor comprises completely drying the gel at 80° C. to 150° C. to give the precursor.

8. A method of preparing the core-shell structured silicate luminescent material according to claim 3, wherein the step of pre-baking said precursor and subjecting the same to grinding comprises pre-baking the precursor at 500° C. to 800° C. for 2 h to 7 h, followed by subjecting the same to grinding after cooling.

9. A method of preparing the core-shell structured silicate luminescent material according to claim 3, wherein the temperature of calcining in air or under a reducing atmosphere is 900° C. to 1600° C., and the time of calcining is 2 h to 10 h.

10. A method of preparing the core-shell structured silicate luminescent material according to claim 3, wherein said reducing atmosphere is a mixed atmosphere comprised of 95 vol % of $N_2$ and 5 vol % of $H_2$.

* * * * *